United States Patent
Ulman et al.

(10) Patent No.: US 9,485,326 B1
(45) Date of Patent: Nov. 1, 2016

(54) SCALABLE MULTI-CLIENT SCHEDULING

(71) Applicant: Marvell Israel (M.I.S.L) Ltd., Yokneam (IL)

(72) Inventors: Sharon Ulman, Yehoshua (IL); Roi Sherman, Yokneam (IL); Dror Bromberg, Michmoret (IL); Carmi Arad, Nofit (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 401 days.

(21) Appl. No.: 14/242,338

(22) Filed: Apr. 1, 2014

Related U.S. Application Data (60) Provisional application No. 61/807,068, filed on Apr. 1, 2013.

(51) Int. Cl.
*H04L 29/08* (2006.01)
*G06F 15/16* (2006.01)

(52) U.S. Cl.
CPC .................. *H04L 67/325* (2013.01)

(58) Field of Classification Search
CPC ..................................... H04L 67/325
USPC ........................................ 709/203
See application file for complete search history.

(56) References Cited

U.S. PATENT DOCUMENTS

| | | | |
|---|---|---|---|
| 5,744,668 A | 4/1998 | Zhou et al. | |
| 5,901,139 A | 5/1999 | Shinohara | |
| 5,951,694 A | 9/1999 | Choquier et al. | |
| 6,034,945 A | 3/2000 | Hughes et al. | |
| 6,377,546 B1 | 4/2002 | Guerin et al. | |
| 6,504,818 B1 | 1/2003 | Levine | |
| 6,625,159 B1 | 9/2003 | Singh et al. | |
| 7,023,840 B2 | 4/2006 | Golla et al. | |
| 7,075,927 B2 | 7/2006 | Mo et al. | |
| 7,158,512 B1* | 1/2007 | Kamhine | H04L 49/254 370/389 |
| 7,245,586 B2 | 7/2007 | Bitar et al. | |
| 7,286,485 B1 | 10/2007 | Ouellette et al. | |
| 7,295,564 B2 | 11/2007 | Ling et al. | |
| 7,321,940 B1* | 1/2008 | Smith | H04L 12/5693 709/230 |
| 7,397,809 B2 | 7/2008 | Wang | |
| 7,443,790 B2 | 10/2008 | Aicklen et al. | |
| 7,463,630 B2 | 12/2008 | Lee | |

(Continued)

OTHER PUBLICATIONS

Arad, Carmi, et al., "Enahnced Tail Dropping in a Switch," U.S. Appl. No. 13/022,303, filed Feb. 7, 2011.

(Continued)

*Primary Examiner* — Suraj Joshi (57) ABSTRACT

A method includes receiving a plurality of requests, determining a plurality of first bank identifiers specifying respective physical memory banks, and selecting, based at least on the first bank identifiers, a first set of requests to be processed according to a scheduling hierarchy. Selecting the first set of requests includes prohibiting any two requests from being associated with a same first bank identifier. The method also includes processing, during a single processing cycle, ones of the first set of requests at respective nodes within a single level of the scheduling hierarchy. The method also includes, responsively at least to processing ones of the first set of requests at respective nodes within the single level of the scheduling hierarchy, selecting a queue, and, responsively at least to selecting the queue, causing one or more packets corresponding to a traffic class associated with the queue to be sent to an egress port.

20 Claims, 5 Drawing Sheets

(56) References Cited

U.S. PATENT DOCUMENTS

| | | |
|---|---|---|
| 7,486,689 B1 | 2/2009 | Mott |
| 7,602,720 B2 | 10/2009 | Bergamasco et al. |
| 7,710,969 B2 | 5/2010 | Szczepanek et al. |
| 7,756,991 B2 | 7/2010 | Chen et al. |
| 7,802,028 B2 | 9/2010 | Andersen et al. |
| 7,948,976 B2 | 5/2011 | Arad et al. |
| 8,149,708 B2 | 4/2012 | Oz et al. |
| 8,218,546 B2 | 7/2012 | Opsasnick |
| 8,422,508 B2 | 4/2013 | Beshai |
| 8,725,873 B1 | 5/2014 | Bromberg |
| 8,948,193 B2 | 2/2015 | Perlmutter et al. |
| 2003/0223442 A1 | 12/2003 | Huang et al. |
| 2005/0177644 A1* | 8/2005 | Basso ................. H04L 12/5693 709/232 |

OTHER PUBLICATIONS

Ulman, Sharon, et al., "Multibank Egress Queuing System in a Network Device," U.S. Appl. No. 14/242,321, filed Apr. 1, 2014.

* cited by examiner

SCALABLE MULTI-CLIENT SCHEDULING

CROSS-REFERENCE TO RELATED APPLICATIONS

This claims the benefit of U.S. Provisional Patent Application No. 61/807,068, entitled "Scalable Multi-Client Scheduler Updates Algorithm" and filed on Apr. 1, 2013, the disclosure of which is hereby incorporated herein by reference.

The present application is related to U.S. patent application Ser. No. 14/242,321, entitled "Multibank Egress Queuing System in a Network Device," and filed on Apr. 1, 2014, the disclosure of which is hereby incorporated herein by reference.

FIELD OF THE DISCLOSURE

The present disclosure relates generally to networks and, more particularly, to scheduling techniques implemented in network devices.

BACKGROUND

Many network devices are configured to provide different quality of service (QoS) levels for different types/classes of traffic. When processing packets associated with a particular traffic class, for example, a network device may ensure that transmission latency is below a certain threshold, ensure that the drop/loss rate is below a certain threshold, apply "best efforts," etc. The QoS level for a particular packet can be important, for example, when multiple packets are forwarded to a single egress port of a network device (e.g., a bridge), and therefore must contend for access to the egress port. In some network devices, each egress port is associated with multiple queues associated with various QoS levels, and a scheduler determines the order in which packets associated with the different queues/QoS levels are sent to the egress port for transmission over the network.

Schedulers in network devices typically implement scheduling hierarchies/trees in which each queue is associated with a leaf node of the tree. "Winning" queues are identified at various intermediate nodes within each hierarchy level, and passed to the next hierarchy level, until the next queue to be de-queued is identified at the root node of the tree. Conventional schedulers of this sort utilize a pipeline architecture that, in any given processing cycle, can process only one eligibility update at each level of the scheduling hierarchy. In network devices where the queue manager sends the scheduler only a single eligibility update at a time, this may not be problematic. Conventionally, the queue manager is capable of sending the scheduler more than one eligibility update at a time, however, conventional schedulers may lose/drop some or all of the eligibility updates that arrive in parallel with other eligibility updates, thereby increasing latencies for traffic associated with the dropped updates.

SUMMARY

In an embodiment, a method, implemented in a network device, for scheduling network traffic includes receiving, in the network device, a plurality of requests each indicating that a respective queue, of a plurality of queues storing data representing packets to be sent to an egress port of the network device for transmission, is eligible for de-queuing, and determining a plurality of first bank identifiers, ones of the first bank identifiers (i) being associated with different ones of the plurality of requests and (ii) specifying respective physical memory banks of the network device. The method also includes selecting, from the received plurality of requests and based at least on the plurality of first bank identifiers, a first set of two or more requests to be processed according to a scheduling hierarchy. Selecting the first set of requests includes prohibiting any two requests of the first set of requests from being associated with a same first bank identifier. The method also includes processing, in the network device and during a single processing cycle, ones of the first set of requests at respective nodes within a single level of the scheduling hierarchy. Processing ones of the first set of requests at the respective nodes within the single level of the scheduling hierarchy includes accessing the physical memory banks, specified by the first bank identifiers associated with the ones of the first set of requests, to update states of the respective nodes within the single level of the scheduling hierarchy. The method also includes, responsively at least to processing ones of the first set of requests at respective nodes within the single level of the scheduling hierarchy, selecting a queue of the plurality of queues, and, responsively at least to selecting the queue, causing one or more packets corresponding to a traffic class associated with the selected queue to be sent to the egress port for transmission.

In another embodiment, a network device includes a plurality of ports including an egress port, a plurality of queues configured to store data representing packets to be sent to the egress port for transmission, a plurality of physical memory banks, and a packet processor. The packet processor includes a queue manager module configured to send requests to de-queue data stored in the plurality of queues, and a scheduler module. The scheduler module includes a request selection module configured to receive, from the queue manager module, a plurality of requests each indicating that a respective queue of the plurality of queues is eligible for de-queuing, and determine a plurality of first bank identifiers, ones of the first bank identifiers (i) being associated with different ones of the plurality of requests and (ii) specifying respective ones of the plurality of physical memory banks. The request selection module is also configured to select, from the received plurality of requests and based at least on the plurality of first bank identifiers, a first set of two or more requests to be processed according to a scheduling hierarchy. The request selection module is configured to select the first set of requests at least by prohibiting any two requests of the first set of requests from being associated with a same first bank identifier. The scheduler module also includes a scheduling hierarchy module configured to process, during a single processing cycle, ones of the first set of requests at respective nodes within a single level of the scheduling hierarchy. The scheduling hierarchy module is configured to process the ones of the first set of requests at the respective nodes within the single level of the scheduling hierarchy at least by accessing the physical memory banks, specified by the first bank identifiers associated with the ones of the first set of requests, to update states of the respective nodes within the single level of the scheduling hierarchy. The scheduling hierarchy module is also configured to, responsively at least to processing the ones of the first set of requests at respective nodes within the single level of the scheduling hierarchy, select a queue of the plurality of queues, and, responsively at least to selecting the queue, cause one or more packets corresponding to a traffic class associated with the selected queue to be sent to the egress port for transmission.

DETAILED DESCRIPTION

In embodiments described below, a scheduler of a network device (e.g., a bridge device, router device, switch device, or any other suitable network device) supports the simultaneous processing of multiple eligibility updates/requests within each of one or more levels of a scheduling hierarchy. In one embodiment, this capability is provided by mapping at least some of the leaf nodes or intermediate nodes within a single hierarchy level to different memory banks that can be simultaneously accessed/updated when processing eligibility updates. In one embodiment and scenario, for example, the state of a first node in a first hierarchy level is represented by a database stored in a first memory bank, and the state of a different, second node in the first hierarchy level is represented by a database stored in a different, second memory bank. In some embodiments, the scheduler first determines which memory banks are associated with which eligibility updates at one or more hierarchy levels, and then selects a set of eligibility updates that will next be processed according to the scheduling hierarchy. In one embodiment, for example, the scheduler selects the set of eligibility updates to be processed by giving preference to older updates before more recent updates, but subject to the restriction that no two eligibility updates associated with a same memory bank can be selected at the same time. In this manner, in an embodiment, collisions in the use of memory resources are avoided while still allowing parallel processing of different eligibility updates at different nodes within a single hierarchy level. In some embodiments, the architectures and algorithms described herein are operable within multi-core network devices, such as devices that include multiple software driven, run-to-completion processing cores, as well as devices that include multiple cores of pipelines that are each defined by either application specific integrated circuit (ASIC) stages, or by programmable software processing stages, for example. In some of these embodiments, the architectures and/or algorithms can be scaled to support a large number of clients (e.g., a large number of processes capable of providing eligibility updates simultaneously).

Figure 1:
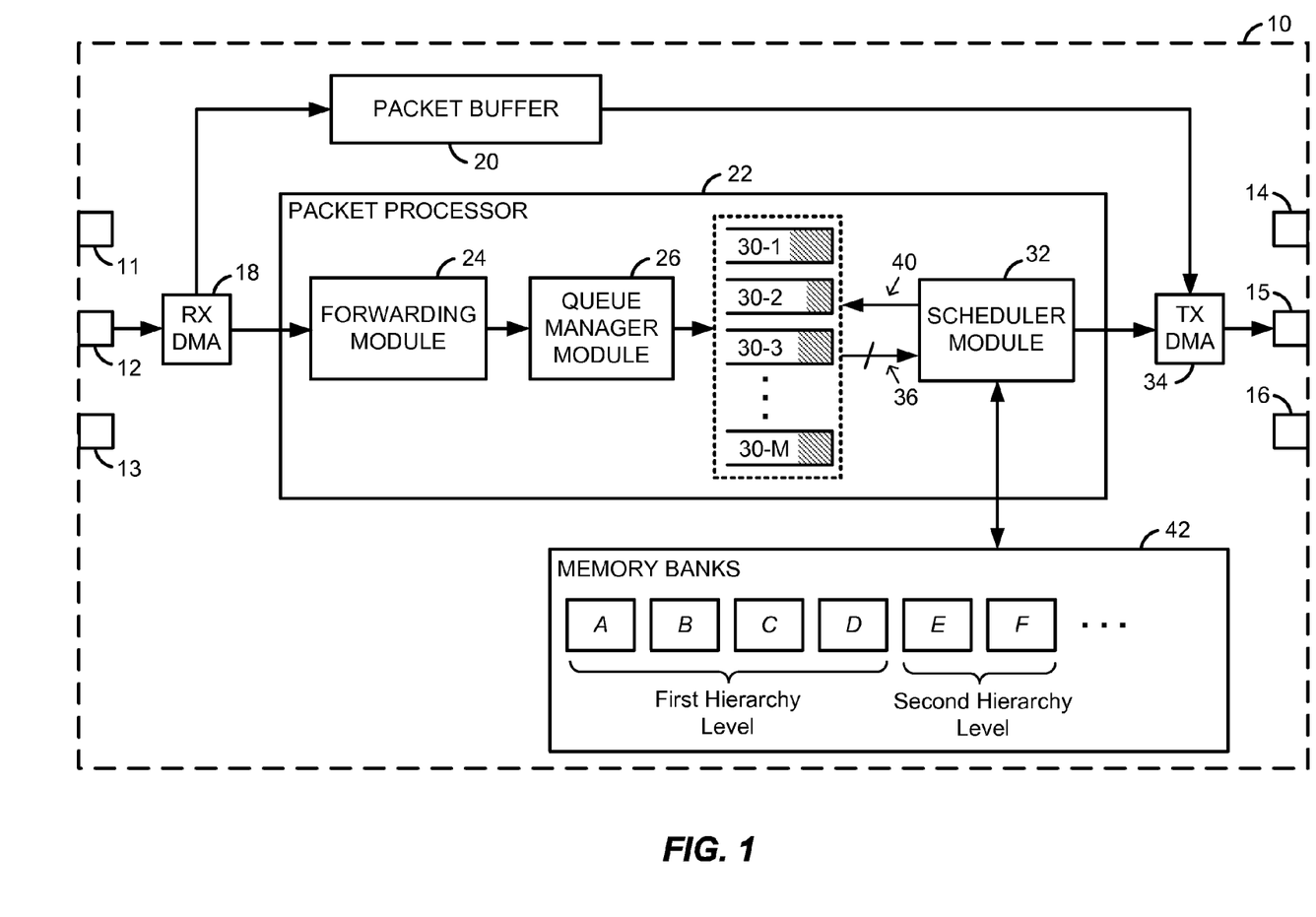
FIG. 1 is a block diagram of an example network device in which scheduling techniques of the present disclosure are implemented, according to an embodiment.

FIG. 1 is a highly simplified block diagram of an example network device 10 in which scheduling techniques of the present disclosure are implemented, according to an embodiment. In various embodiments, the network device 10 is a bridge device, router device, switch device, or any other suitable network device configured to operate within a networked environment. The network device 10 shown in the embodiment of FIG. 1 includes at least ports 11-16. In some embodiments, each of ports 11-16 is a bidirectional port that can act as either an ingress port or an egress port. In other embodiments, ports are dedicated to be either ingress ports or egress ports. For instance, each of ports 11-13 is a dedicated ingress port and each of ports 14-16 is a dedicated egress port, in an embodiment. While FIG. 1 only shows six ports, in other embodiments network device 10 includes more than six ports or fewer than six ports. In various embodiments, network device 10 is configured to handle unicast, multicast and/or broadcast traffic. FIG. 1 illustrates an embodiment in which network device 10 is capable of at least unicast operation, and a scenario in which a packet ingresses via port 12 and egresses via port 15 in a unicast manner. It is noted that, in other scenarios and/or embodiments, a packet instead ingresses via a different port, egresses via a different port, and/or egresses via multiple ports in a multicast or broadcast manner.

In the example embodiment of FIG. 1, ingress port 12 is coupled to a receive-side direct memory access (Rx DMA) 18. Rx DMA 18 is configured to write packets received via ingress port 12 to a packet buffer 20. In some embodiments, network device 10 includes one or more other Rx DMAs coupled to one or more respective ingress ports (e.g., ports 11 and 13, and/or one or more ports not seen in FIG. 1). Additionally or alternatively, in some embodiments, Rx DMA 18 is a channelized Rx DMA associated with a group of two or more ports (that is, ingress port 12 and one or more other ports), where each port within the group is associated with a different DMA context. In various embodiments, packet buffer 20 is a random access memory (RAM), or any other suitable type of memory.

In an embodiment, Rx DMA 18 extracts headers (and/or other portions) of packets received at ingress port 12 and provides the headers to a packet processor 22. In an alternative embodiment, packet processor 22 includes a module (not seen in FIG. 1) that extracts the packet headers and/or other packet portions. In some embodiments, packet processor 22 uses the headers and/or other packet portions to generate descriptors representing the packets, and processes the descriptors at a forwarding module 24 to make forwarding decisions for respective packets. In various embodiments, forwarding module 24 uses destination address information, such as media access control (MAC) destination addresses of packets, as indices/keys to a forwarding database (e.g., a database stored in a ternary content addressable memory (TCAM), a static random access memory (SRAM), a dynamic random access memory (DRAM) or another suitable type of memory) in order to determine the egress ports to which the packets are to be forwarded. In an embodiment, forwarding module 24 modifies each descriptor to reflect the respective forwarding decision.

As noted above, FIG. 1 depicts an embodiment and scenario in which forwarding module 24 determines that one or more packets received at ingress port 12 are to be forwarded to at least egress port 15. Thus, in this embodiment/scenario, forwarding module 24 provides the descriptor(s) to a queue manager module 26 managing queues 30-1 through 30-M associated with egress port 15. In an embodiment, queues 30-1 through 30-M are buffers (e.g., first-in-first-out (FIFO) buffers) configured to store descriptors from forwarding module 24. In various embodiments, queues 30-1 through 30-M are implemented in SRAM, DRAM, or any other suitable type of memory. In some embodiments, some or all of queues 30-1 through 30-M are associated with different traffic classes, and queue manager module 26 sends each descriptor to the appropriate one of queues 30-1 through 30-M based on a traffic class of the corresponding packet. In some embodiments, packet processor 22 determines the traffic class of each packet, and/or modifies the corresponding descriptor to reflect the traffic class of the packet, before the descriptor is sent to queue manager module 26. In various embodiments, for example, this packet classification is performed by forwarding module 24, and/or by another module of packet processor 22 not seen in FIG. 1.

In one embodiment, each traffic class (and, therefore, each queue associated with that traffic class) corresponds to a particular quality of service (QoS) level. In one embodiment, for example, queue 30-1 is associated with low latency traffic, queue 30-2 is associated with low loss traffic, queue 30-3 is associated with "best effort" traffic, etc. In some embodiments, each of queues 30-1 through 30-M is associated with a different QoS level. In other embodiments, each of at least some of the QoS levels supported by network device 10 is associated with two or more of queues 30-1 through 30-M. In an embodiment, each of queues 30-1 through 30-M is configured to store multiple descriptors corresponding to multiple packets destined for egress port 15. While FIG. 1 only shows the path for traffic that is received at ingress port 12 and forwarded to egress port 15, it is noted that, in some embodiments and/or scenarios, at least some of the queues 30-1 through 30-M also buffer descriptors corresponding to traffic from other ingress ports (e.g., from port 11, port 13, and/or one or more other ports not seen in FIG. 1).

In an embodiment, a scheduler module 32 determines the order in which the queues 30-1 through 30-M are de-queued. Scheduler module 32 is described in more detail below in connection with FIGS. 3 and 4, according to one embodiment. When one of queues 30-1 through 30-M is "de-queued," in an embodiment, one or more descriptors from the queue are sent to a transmit-side DMA (Tx DMA) 34 associated with egress port 15. In an embodiment, Tx DMA 34 is configured to retrieve/read packets, stored in packet buffer 20, that correspond to the descriptors received from queues 30-1 through 30-M, and to provide the retrieved packets to egress port 15. In an embodiment, network device 10 also includes one or more other Tx DMAs coupled to one or more respective egress ports (e.g., port 14, port 15, and/or one or more ports not seen in FIG. 1). In some embodiments, each Tx DMA of network device 10 is associated with a single port. In other embodiments, a channelized Tx DMA is associated with a group of ports, with each port being associated with a DMA context.

In an embodiment, packet processor 22 includes, or is included in, one or more tangible/physical processors of network device 10 that collectively implement multi-core processing. In an embodiment, the one or more physical processors are configured to read and execute software or firmware instructions stored on a tangible, non-transitory, computer-readable memory (e.g., a magnetic disk, optical disk, read-only memory (ROM), random access memory (RAM), etc.), the processor(s) being configured to execute the instructions to perform packet processing operations based on a processing context. In some embodiments, the software or firmware instructions include computer-readable instructions that, when executed by the processor(s), cause the processor(s) to perform any of the various actions of packet processor 22 described herein. In one such embodiment, forwarding module 24, queue manager module 26, and/or scheduler module 32 are implemented as respective software or firmware modules, with each module corresponding to instructions executed by packet processor 22. In this embodiment, the order of forwarding module 24, queue manager module 26, and/or scheduler module 32 shown in FIG. 1 corresponds only to orders of operation rather than physical locations (e.g., rather than location within a hardware pipeline).

In one embodiment in which the physical processor(s) implement multi-core processing, forwarding module 24 is implemented by a processing core that handles traffic received via ingress port 12, and forwarding modules associated with other ingress ports (e.g., ingress port 11, ingress port 13, and/or one or more other ingress ports not seen in FIG. 1) are implemented by other processing cores. Further, in an embodiment, scheduler module 32 is implemented by a processing core that handles traffic forwarded to egress port 15, and scheduler modules associated with other egress ports (e.g., egress port 14, egress port 16, and/or one or more other egress ports not seen in FIG. 1) are implemented by other processing cores. In an embodiment, queue manager module 26 is implemented using a processing core separate from the processing cores implementing forwarding module 24 and scheduler module 32, and receives not only descriptors processed by forwarding module 24, but also descriptors processed by forwarding modules (not seen in FIG. 1) implemented by other processing cores associated with other ingress ports (e.g., ingress port 11, ingress port 13, and/or one or more other ingress ports not seen in FIG. 1). In this manner, in some multi-core embodiments, queue manager module 26 can receive multiple descriptors, representing multiple packets forwarded to egress port 15, in a single processing cycle.

In an alternative embodiment, portions of packet processor 22 are implemented as packet processing pipelines. In one embodiment, for example, forwarding module 24 is a part of an ingress pipeline implemented in hardware, such as one or more application-specific integrated circuits (ASICs) or any other suitable type(s) of hardware circuit(s). In one such embodiment, queue manager module 26 receives not only descriptors processed by the ingress pipeline that includes forwarding module 24, but also descriptors processed by other ingress pipelines associated with other ingress ports (e.g., ingress port 11, ingress port 13, and/or one or more other ingress ports not seen in FIG. 1). Accordingly, in this embodiment, queue manager module 26 can receive multiple descriptors, representing multiple packets forwarded to egress port 15, in a single processing cycle.

While FIG. 1 shows only forwarding module 24, queue manager module 26, and scheduler module 32 within packet processor 22, in other embodiments packet processor 22 includes one or more additional modules. In various embodiments, for example, packet processor 22 includes an ingress and/or egress policy module, an ingress and/or egress metering module, a tunnel interface module, etc. Additionally or alternatively, in some embodiments, one or more modules of this sort (e.g., an ingress policy module) are included within forwarding module 24.

In an embodiment, queue manager module 26 manages the queues 30-1 through 30-M by writing descriptors from forwarding module 24, and descriptors from other forwarding modules associated with other ingress ports, to the appropriate queues, and by causing queues to be de-queued (e.g., reading the queued descriptors and sending the descriptors to Tx DMA 34, in an embodiment) in accordance with the scheduled order as determined by scheduler module 32. To support the scheduling operations of scheduler module 32, in an embodiment, scheduler module 32 receives eligibility updates 36 reflecting changes in the states of various queues of queues 30-1 through 30-M. In one embodiment, each of the eligibility updates 36 is sourced by a respective processing core (e.g., by the core associated with forwarding module 24, or by a core associated with a different forwarding module not seen in FIG. 1), and sent to scheduler module 32 when the corresponding one of queues 30-1 through 30-M changes from an empty to a non-empty state (e.g., when the corresponding queue buffers a first descriptor, in an embodiment). In an alternative embodiment, each of the eligibility updates 36 is sent to scheduler module 32 any time that the corresponding queue buffers more data (e.g., an additional descriptor), regardless of whether the queue had previously been in a non-empty state. While FIG. 1 shows eligibility updates 36 passing from queues 30 to scheduler module 32, it is noted that, in some embodiments, the eligibility updates 36 are sent to scheduler module 32 by queue manager module 26.

As noted above, the queue manager module 26 in some embodiments and/or scenarios receives descriptors from multiple forwarding modules in a single processing cycle. In response, in some of these embodiments and/or scenarios, queue manager module 26 sends multiple eligibility updates to scheduler module 32 in a single processing cycle. In one embodiment and scenario, for example, scheduler module 32 receives a different eligibility update for each queue that changes from an empty to a non-empty state as a result of the multiple descriptors that queue manager module 26 received in parallel. In another embodiment and scenario, scheduler module 32 receives a different eligibility update for each queue that stores one of the multiple descriptors that queue manager module 26 received in parallel, regardless of whether the queue was previously in an empty state.

In an embodiment, scheduler module 32 processes some or all of the eligibility updates 36 from queue manager module 26 by implementing a scheduling hierarchy having one or more levels, and schedules the queues corresponding to some or all of the eligibility updates 36 according to scheduling algorithms (and, in some embodiments, rate shaping and/or other algorithms) of the scheduling hierarchy. When scheduler module 32 determines that a particular queue is next to be de-queued, in an embodiment, scheduler module 32 generates a de-queue command 40 specifying the queue. While FIG. 1 shows de-queue command 40 as passing from scheduler module 32 to queues 30, it is noted that, in some embodiments, scheduler module 32 sends the de-queue command 40 to queue manager module 26. In some embodiments, the de-queue command 40 also includes additional information, such as information indicating the target egress port (here, egress port 15) for the descriptor/packet, and/or information specifying how many descriptors/packets are to be de-queued from the queue, for example. In response to the de-queue command 40, in an embodiment, queue manager module 26 de-queues the appropriate queue by the appropriate amount, and sends the corresponding descriptor(s) to Tx DMA 34 to cause the corresponding packet(s) to be sent to egress port 15. In some embodiments, scheduler module 32 also utilizes the de-queue command 40 to update the scheduling hierarchy accordingly (e.g., to update the state of various hierarchy nodes).

In some embodiments and scenarios, and unlike conventional schedulers unable to handle multiple eligibility updates at once from a queue manager, scheduler module 32 processes at least two of the eligibility updates 36 in parallel when queue manager module 26 sends scheduler module 32 more than one eligibility update at a time. In some embodiments, this parallel processing is supported by utilizing memory bank resources 42 that include multiple physical memory banks (memory banks A, B, C, etc.). In the example embodiment of FIG. 3, memory banks A through D are mapped to various nodes within a first level of a scheduling hierarchy implemented by scheduler module 32, memory banks E and F are mapped to various nodes within a second level of the scheduling hierarchy, etc. In other embodiments, different numbers of memory banks are mapped to each hierarchy level. As will be discussed in more detail below, mapping different memory banks to different nodes within a single hierarchy level generally allows multiple eligibility updates to be processed at the hierarchy level during a single processing cycle. In an embodiment, each of the physical memory banks of memory banks 42 is a bank of an SRAM, or other suitable memory type, that can be accessed and/or updated only once per processing cycle.

Figure 2:
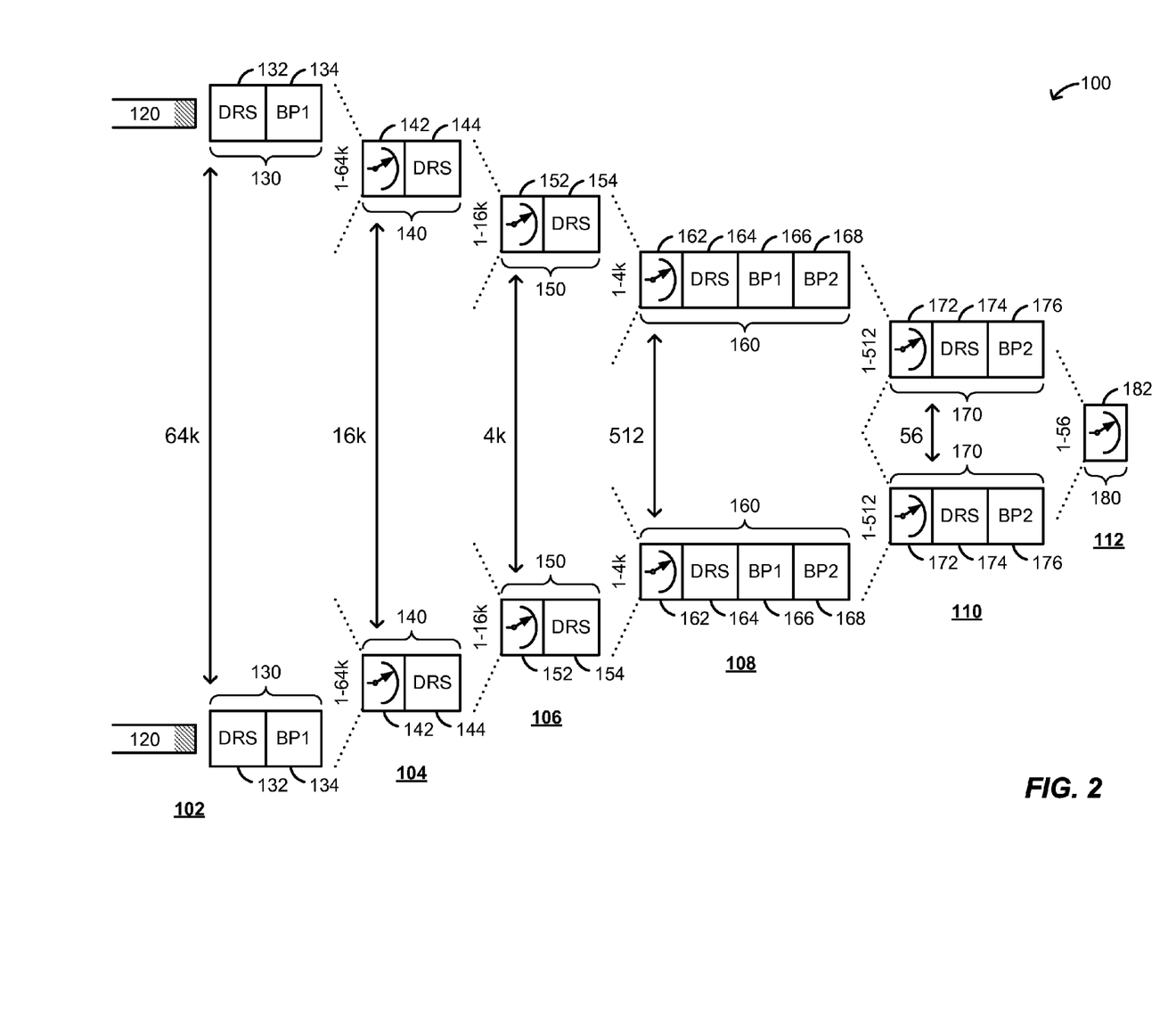
FIG. 2 is a flow diagram of an example configurable scheduling hierarchy implemented by the scheduler module of FIG. 1, according to an embodiment.

FIG. 2 is a flow diagram of an example configurable scheduling hierarchy 100 implemented by the scheduler module 32 of FIG. 1, according to an embodiment. In an embodiment, for example, the scheduling hierarchy 100 represents an algorithm defined by software instructions that are stored on a tangible, non-transitory, computer-readable memory (e.g., a magnetic disk, optical disk, ROM, RAM, etc.), and are executed by one or more physical processors of packet processor 22 when implementing the functionality/operations of scheduler module 32. In some embodiments, the software instructions that are executed to implement the algorithm of scheduling hierarchy 100 are manually configured by a user, and/or are automatically configured, via one or more software applications.

In the example embodiment of FIG. 2, the scheduling hierarchy 100 is configured to include up to six hierarchy levels 102, 104, 106, 108, 110 and 112, each containing a number of "nodes" corresponding to one or more functional blocks. It is noted that, in other embodiments, the example scheduling hierarchy 100 is instead configured to have more, or fewer, levels than are seen in FIG. 2, the various levels have more or fewer nodes than are seen in FIG. 2, the scheduling hierarchy 100 is arranged in a different manner (e.g., with different parent/child node connections) than is seen in FIG. 2, and/or one, some or all of the nodes of the scheduling hierarchy 100 include fewer, more, and/or different functional blocks than are seen in FIG. 2. In the example embodiment of FIG. 2, however, the first level 102 of the scheduling hierarchy 100 is configured to support up to 64,000 queues 120 by providing up to 64,000 respective leaf nodes 130, each leaf node 130 implementing a dual-rate shaper block 132 and/or a backpressure block 134. Further, in this embodiment, the second level 104 of the scheduling hierarchy 100 is configured to provide up to 16,000 intermediate nodes 140 each implementing a scheduler block 142 and/or a dual-rate shaper block 144, the third level 106 is configured to provide up to 4,000 intermediate nodes 150 each implementing a scheduler block 152 and/or a dual-rate shaper block 154, the fourth level 108 is configured to provide up to 512 intermediate nodes 160 each implementing a scheduler block 162, a dual-rate shaper block 164, a first backpressure block 166, and/or a second backpressure block 168, the fifth level 110 is configured to provide up to 56 intermediate nodes 170 each implementing a scheduler block 170, a dual-rate shaper block 172, and/or a backpressure block 174, and the sixth level 112 is configured to provide a root node 180 implementing a scheduler block 182.

The dotted lines and associated text (e.g., "1-64k," "1-16k," etc.) shown in FIG. 2 represent configurable mapping ranges for the respective nodes. Thus, in this embodiment, the scheduling hierarchy 100 is configured with any one of a large variety of possible parent/child node configurations between the various levels 102, 104, 106, 108, 110 and 112. In one embodiment, for example, the scheduling hierarchy 100 is configured symmetrically such that each of intermediate nodes 140 is a parent node to four of leaf nodes 130, and each of intermediate nodes 150 is a parent node to four of intermediate nodes 140, etc. Alternatively, in an embodiment, the scheduling hierarchy 100 is configured in an asymmetric manner at one or more of the levels 102, 104, 106, 108 and 110. In one embodiment, for example, the scheduling hierarchy 100 is configured such that a first one of intermediate nodes 140 is a parent node to 16,000 of leaf nodes 130, a second one of intermediate nodes 140 is a parent node to 4,000 of leaf nodes 130, etc.

After the scheduling hierarchy 100 has been configured, in an embodiment, eligibility updates associated with various queues of queues 120 are processed according to the scheduling hierarchy 100. Generally, in an embodiment, eligibility updates filter through the scheduling hierarchy 100 from the respective leaf nodes 130, through the respective parent nodes of intermediate nodes 140, 150, 160 and 170, to the root node 180. At each of the hierarchy levels 104, 106, 108, 110 and 112, in an embodiment, the respective scheduler block (i.e., one of scheduler blocks 142, 152, 162, 172 or 182) identifies an eligibility update that is to be given scheduling priority relative to other eligibility updates being processed by the scheduler block, and passes the identified eligibility update to the parent node. At the root node 180, in an embodiment, a single eligibility update is identified by scheduler block 182, with the associated queue becoming the next queue 120 to be de-queued. In one embodiment in which the scheduling hierarchy 100 is implemented in the scheduler module 32 of FIG. 1, for example, each queue selected at the root node 180 is specified in a respective de-queue command similar to de-queue command 40 of FIG. 1. As will be described in more detail below in connection with FIGS. 3 and 4, in some embodiments, eligibility updates are ordered prior to processing at each of one or more of the hierarchy levels 102, 104, 106, 108 and 110 in a manner that allows those hierarchy levels to process two or more eligibility updates in parallel without exceeding the memory/processing resources of network device 10.

In an embodiment, the various scheduler blocks 142, 152, 162, 172 and 182 implement respective scheduling algorithms. In an embodiment, the scheduling algorithms are defined by the corresponding QoS level(s), and/or are configurable via software. In various embodiments, for example, one, some or all of the scheduler blocks 142, 152, 162, 172 and 182 implements a round robin algorithm (e.g., deficit weighted round robin) and/or strict priority queuing.

In an embodiment, the dual-rate shaping blocks 132, 144, 154, 164 and 174 of the various nodes are each configured to shape traffic (e.g., perform rate limiting) according to a corresponding QoS level or group of QoS levels. In one embodiment, for example, the dual-rate shaping block 132 of a particular leaf node 130 processes an eligibility update from the respective queue 120 by applying a traffic shaping algorithm of the QoS level associated with that queue 120. In another example embodiment, the dual-rate shaping block 144 of a particular intermediate node 140 processes an eligibility update by applying a traffic shaping algorithm that is common to all of the QoS levels that are associated with child nodes of that intermediate node 140.

In an embodiment, the backpressure blocks 134 and 166 (each denoted as "BP1" in FIG. 2) are each configured to implement flow control in response to backpressure generated internally within network device 10. In an embodiment, the backpressure blocks 168 and 176 (each denoted as "BP2" in FIG. 2) are each configured to implement flow control in response to backpressure generated externally in a different network device (e.g., a device coupled to egress port 15). In some embodiments, the scheduling hierarchy 100 does not schedule de-queuing for a particular queue/port when flow control is activated.

Figure 3:
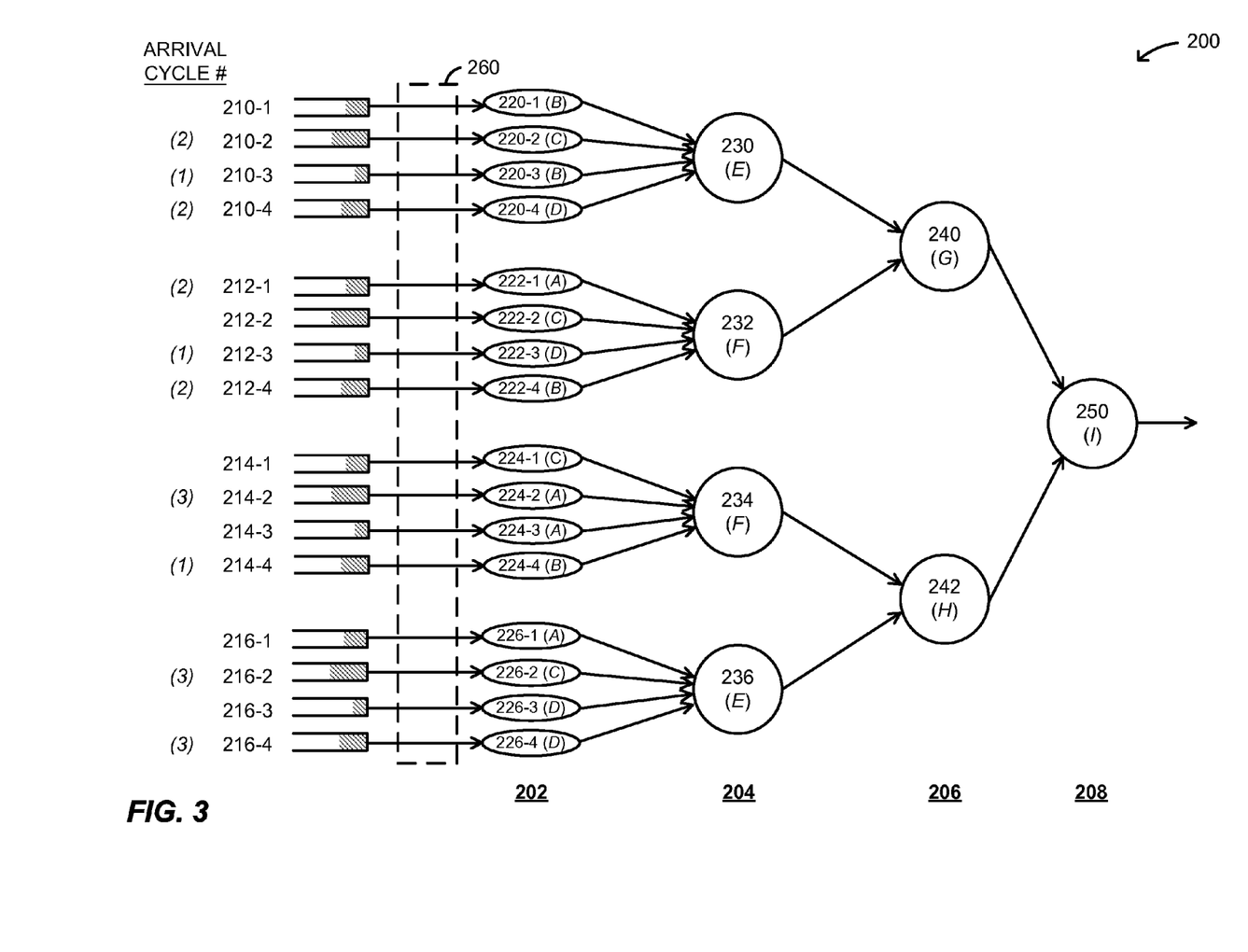
FIG. 3 is a flow diagram of an example configuration of the scheduling hierarchy of FIG. 2, according to an embodiment.

One configuration of a relatively simple, example scheduling hierarchy 200 is shown in FIG. 3, according to an embodiment. In one embodiment, the scheduling hierarchy 200 is one specific configuration of the configurable scheduling hierarchy 100 of FIG. 2. In an embodiment, the scheduling hierarchy 200 is implemented by the scheduler module 32 of FIG. 1. In the embodiment of FIG. 3, the scheduling hierarchy 200 includes a first (queue) level 202, a second level 204, a third level 206, and a fourth (root) level 208. In an embodiment, queues 210-1 through 210-4 are a first set of queues within queues 30-1 through 30-M of FIG. 1, queues 212-1 through 212-4 are a second set of queues within queues 30-1 through 30-M, queues 214-1 through 214-4 are a third set of queues within queues 30-1 through 30-M, and queues 216-1 through 216-4 are a fourth set of queues within queues 30-1 through 30-M, with each set of queues 210, 212, 214 and 216 being mutually exclusively (i.e., with no queue being included in more than one set of queues). In the embodiment of FIG. 3, eligibility updates for queues 210-1 through 210-4 are provided to respective ones of leaf nodes 220-1 through 220-4 in hierarchy level 202, eligibility updates for queues 212-1 through 212-4 are provided to respective ones of leaf nodes 222-1 through 222-4 in hierarchy level 202, eligibility updates for queues 214-1 through 214-4 are provided to respective ones of leaf nodes 224-1 through 224-4 in hierarchy level 202, and eligibility updates for the queues 216-1 through 216-4 are provided to respective ones of leaf nodes 226-1 through 226-4 in hierarchy level 202. In an embodiment, the various eligibility updates are all included in the eligibility updates 36 received from queue manager module 24 of FIG. 1. In one embodiment, each of the nodes within leaf nodes 220-1 through 220-4, 222-1 through 222-4, 224-1 through 224-4, and/or 226-1 through 226-4 includes functional blocks the same as or similar to the functional blocks of a leaf node 130 of FIG. 2.

Also in the embodiment of FIG. 3, the leaf nodes 220-1 through 220-4 are child nodes with respect to an intermediate node 230 in hierarchy level 204, the leaf nodes 222-1 through 222-4 are child nodes with respect to an intermediate node 232 in hierarchy level 204, the leaf nodes 224-1 through 224-4 are child nodes with respect to an intermediate node 234 in hierarchy level 204, and the fourth set of leaf nodes 226 are child nodes with respect to an intermediate node 236 in hierarchy level 204. In one embodiment, intermediate nodes 230, 232, 234 and/or 236 include functional blocks the same as or similar to the functional blocks of an intermediate node 140, or an intermediate node 160, of FIG. 2.

Further, in the embodiment of FIG. 3, the intermediate nodes 230 and 232 are child nodes with respect to an intermediate node 240 in hierarchy level 206, and the intermediate nodes 234 and 236 are child nodes with respect to an intermediate node 242 in hierarchy level 206. In one embodiment, intermediate nodes 240 and/or 242 include functional blocks the same as or similar to the functional blocks of an intermediate node 160, or an intermediate node 170, of FIG. 2. Finally, in the embodiment of FIG. 3, the intermediate node 240 and the intermediate node 242 are child nodes with respect to a root node 250 in hierarchy level

208. In one embodiment, root node 250 includes functional blocks the same as or similar to the functional blocks of root node 180 of FIG. 2.

In an embodiment, a current state of each of the various leaf, intermediate, and root nodes in the scheduling hierarchy 200 (e.g., a current state of the scheduler block, shaper block, and/or other functional block(s) implemented at the node) is represented by a set of database entries for the queues associated with the node. In one embodiment, for example, each of leaf nodes 220-1 through 220-4 is associated with a database having a single entry corresponding to a respective one of queues 210-1 through 210-4, intermediate node 230 is associated with a database having entries for all of queues 210, intermediate node 232 is associated with a database having entries for all of queues 212, intermediate node 240 is associated with a database having entries for all of queues 210 and 212, root node 250 is associated with a database having entries for all of queues 210, 212, 214 and 216, etc. In an embodiment, processing an eligibility update at a leaf, intermediate, or root node includes updating, in the respective database, the entry for the queue corresponding to the eligibility update.

Generally, in an embodiment, the various databases storing the states of the various nodes of scheduling hierarchy 200 are stored in physical memory banks that can each be accessed/updated once per processing cycle, such as the memory banks within memory banks 42 of FIG. 1, for example. In conventional schedulers for network devices, a single database (corresponding to a single memory) is shared among all nodes at each hierarchy level, which allows only a single eligibility update to be processed at each hierarchy level in each processing cycle. As a result, some eligibility updates may be lost/dropped if any level of the scheduler receives multiple eligibility updates at once. In some embodiments described herein, however, a scalable solution is implemented in which multiple databases are utilized for at least one of the hierarchy levels 202, 204 and 206, with the different databases in a given level being stored in different physical memory banks that are accessed/updated in parallel. In the example embodiment of FIG. 3, this arrangement is depicted by showing the letter that identifies the memory bank for each node in parentheses. FIG. 3 corresponds to an embodiment in which four memory banks (memory banks A, B, C and D) are shared among the 16 leaf nodes 220, 222, 224 and 226 of hierarchy level 202, two memory banks (memory banks E and F) are shared among the four intermediate nodes 230, 232, 234 and 236 of hierarchy level 204, two memory banks (memory banks G and H) are shared among the two intermediate nodes 240 and 242 of hierarchy level 206, and a single memory bank (memory bank I) is used by the root node 250 of hierarchy level 208. In other embodiments, each level of the scheduling hierarchy 200 shares a same number of memory banks (e.g., hierarchy level 202 shares a set of N memory banks, hierarchy level 204 shares a different set of N memory banks, etc.). In some embodiments, nodes that share a same memory bank also share a same database that includes entries for all of the queues associated with those nodes. In an embodiment, each of the nine memory banks A through I is one of the memory banks in memory banks 42 of FIG. 1.

In some embodiments, memory banks are mapped to the various nodes of the scheduling hierarchy 200 (e.g., during software configuration of the scheduling hierarchy 200, in an embodiment) in a pseudo-random manner. In some embodiments, however, the memory banks are mapped with the constraint that there be equal, or nearly equal, re-use of all memory banks within a particular hierarchy level. In the example embodiment of FIG. 3, for example, the four memory banks A-D are assigned to hierarchy level 202 such that each memory bank is assigned to exactly one of four mutually exclusive sets of four leaf nodes in hierarchy level 202, the two memory banks E and F of hierarchy level 204 are assigned such that each is assigned to exactly one of two mutually exclusive sets of two intermediate nodes in hierarchy level 204, etc. In other embodiments, the mapping is pseudo-random without any such constraints, pseudo-random with other suitable constraints, or not randomized at all (e.g., in increasing order by memory bank number, or as manually set by a user, etc.). As seen in the example embodiment of FIG. 3, the allocation of memory bank resources and the number of nodes per level requires some re-use/sharing of memory banks between different leaf nodes at hierarchy level 202, and some re-use/sharing of memory banks between different intermediate nodes at hierarchy level 204, but no re-use/sharing at hierarchy level 206 or, of course, at the root hierarchy level 208. In other embodiments, however, memory banks are re-used/shared at each of more than two levels, at each of fewer than two levels, or at no levels.

In the example scheduling hierarchy 200, congestion/collisions may arise in certain scenarios. In one embodiment/scenario in which a first eligibility update arrives at leaf node 220-1 at the same time that a second eligibility update arrives at leaf node(s) 220-3, 222-4 or 224-4, for example, only one of the eligibility updates will be able to access/update the shared memory bank (here, memory bank B) in the processing cycle. In some embodiments, the remaining eligibility updates are lost or delayed, thereby increasing latency for the corresponding packet(s). To reduce the number of collisions, in an embodiment, eligibility updates arriving in a particular time order are re-ordered to provide eligibility updates to the nodes that have available memory banks, while still favoring older eligibility updates over newer eligibility updates. In the embodiment of FIG. 3, for example, eligibility updates arriving at hierarchy level 202 are re-ordered in a re-ordering operation 260 prior to processing at any of leaf nodes 220-1 through 220-4, 222-1 through 222-4, 224-1 through 224-4, or 226-1 through 226-4. The re-ordering operation 260 will be described in more detail below in connection with FIG. 4, according to an embodiment.

Figure 4:
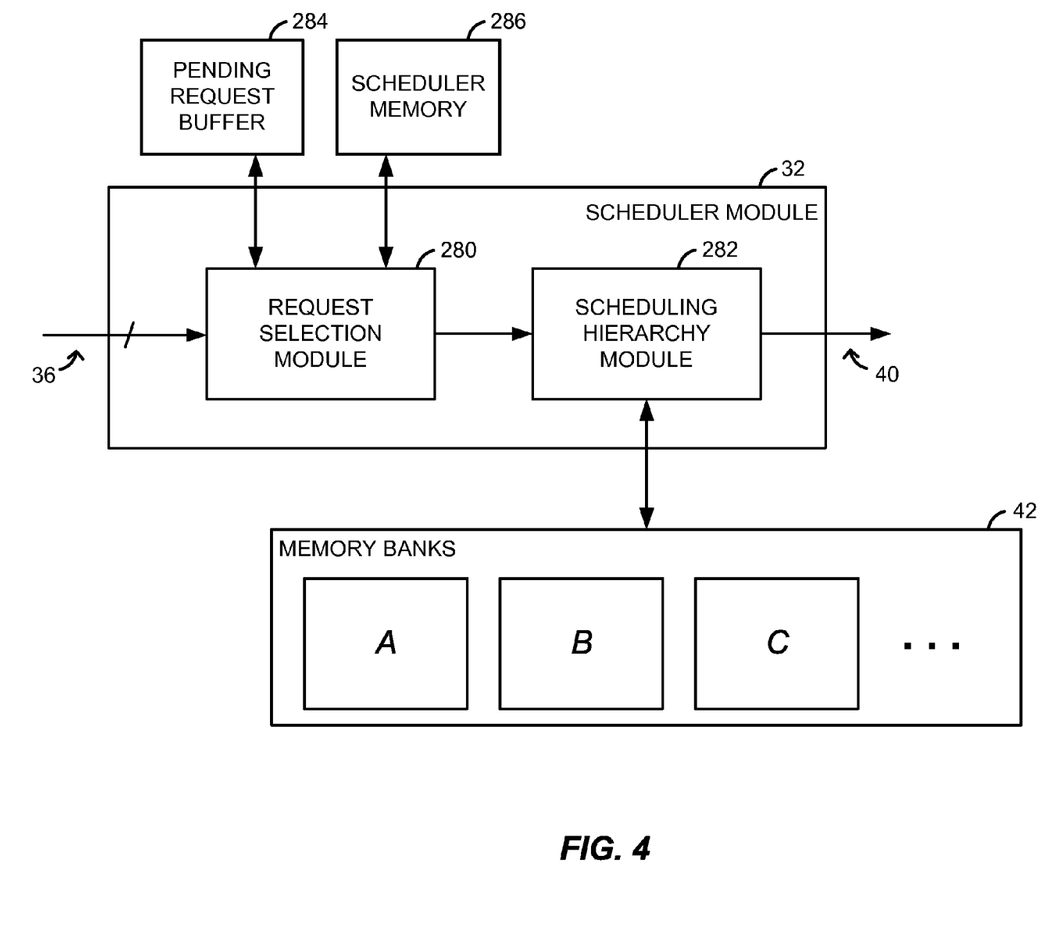
FIG. 4 is a block diagram showing additional detail with respect to the scheduler module of FIG. 1, according to an embodiment.

FIG. 4 is a block diagram showing additional detail with respect to the scheduler module 32 of FIG. 1, according to one embodiment. In the embodiment of FIG. 4, scheduler module 32 includes a request selection module 280 and a scheduling hierarchy module 282. Request selection module 280 is generally configured to perform the re-ordering operation 260 of FIG. 3 by selecting particular eligibility updates/requests to be processed according to the scheduling hierarchy 200, in an embodiment. Request selection module 280 is coupled to a pending request buffer 284, and inserts/writes the received eligibility updates 36 updates into pending request buffer 284 in the order that the eligibility updates 36 arrive from queue manager module 26 (e.g., from oldest to newest), in an embodiment. In one embodiment in which the queue manager module 26 can provide more than one eligibility update at a time, the request selection module 280 uses a round robin algorithm to determine the order in which the simultaneous eligibility updates are inserted into the pending request buffer 284. In an embodiment, the pending request buffer(s) 284 is implemented using flip-flops, or any other suitable type of storage/memory.

Scheduling hierarchy module 282 generally is configured to perform the processing at each of the various leaf/intermediate/root nodes in the scheduling hierarchy 200 of FIG. 3, in an embodiment. To this end, in an embodiment, scheduling hierarchy module 282 is coupled to memory banks 42, and accesses/updates various memory banks within memory banks 42 according to the nodes (e.g., based on which memory bank corresponds to a given node) and according to the eligibility updates (e.g., based on which queue entry stored in the memory bank corresponds to the eligibility update). In one embodiment in which scheduler module 32 implements the scheduling hierarchy 200, for example, scheduling hierarchy module 282 accesses/updates memory bank B when performing the processing associated with the functional blocks of leaf node 220-1, accesses/updates memory bank C when performing the processing associated with the functional blocks of leaf node 220-2, accesses/updates memory bank E when performing the processing associated with the functional blocks of intermediate node 230, etc.

To re-order the updates/requests in the pending request buffer 284 such that the probability of a collision and/or lost updates is decreased within the scheduling hierarchy 200, in an embodiment, request selection module 280 utilizes a priori knowledge of which of queues 210, 212, 214, 216 (and thus, which of the eligibility updates 36) are associated with which memory banks at one or more levels of the scheduling hierarchy 200. In one embodiment, this information is stored in a scheduler memory 286 coupled to request selection module 280. In various embodiments, the scheduler memory 286 is an SRAM or other suitable memory type. In an embodiment, the information stored in scheduler memory 286 can be represented as a respective set of vectors associated with each queue, with each vector indicating which memory bank will need to be accessed/updated at each level of the scheduling hierarchy 200. In one embodiment, for example, scheduler memory 286 stores information represented by the following set of vectors associated with queue 210-1, where $Q_1^j$ refers to the memory bank identifier for the j-th level of scheduling hierarchy 200 for queue 210-1:

$$Q_1^1 = \begin{bmatrix} 0 \\ 1 \\ 0 \\ 0 \end{bmatrix}, Q_1^2 = \begin{bmatrix} 1 \\ 0 \end{bmatrix}, Q_1^3 = \begin{bmatrix} 1 \\ 0 \end{bmatrix}$$

In an embodiment, the vector $Q_1^1$ indicates that the second of four memory banks (i.e., memory bank B of banks A through D) will be needed to process eligibility updates associated with queue 210-1 at hierarchy level 202, the vector $Q_1^2$ indicates that the first of two memory banks (i.e., memory bank E of banks E and F) will be needed to process eligibility updates associated with queue 210-1 at the hierarchy level 204, and the vector V indicates that the first of two memory banks (i.e., memory bank G of banks G and H) will be needed to process eligibility updates associated with queue 210-1 at the hierarchy level 206. As another example, in an embodiment, scheduler memory 286 stores information that can be represented by the following set of vectors associated with queue 210-2, where $Q_2^j$ refers to the memory bank identifier for the j-th level of scheduling hierarchy 200 for queue 210-2:

$$Q_2^1 = \begin{bmatrix} 0 \\ 0 \\ 1 \\ 0 \end{bmatrix}, Q_2^2 \begin{bmatrix} 1 \\ 0 \end{bmatrix}, Q_2^3 = \begin{bmatrix} 1 \\ 0 \end{bmatrix} \quad \text{(Equation 1)}$$

As yet another example, in an embodiment, scheduler memory 286 stores information that can be represented by the following set of vectors associated with queue 212-1, where $Q_5^j$ refers to the memory bank identifier for the j-th level of scheduling hierarchy 200 for queue 212-1:

$$Q_5^1 = \begin{bmatrix} 1 \\ 0 \\ 0 \\ 0 \end{bmatrix}, Q_5^2 \begin{bmatrix} 0 \\ 1 \end{bmatrix}, Q_5^3 = \begin{bmatrix} 1 \\ 0 \end{bmatrix} \quad \text{(Equation 2)}$$

In other embodiments, the bank identifier information stored in scheduler memory 286 for the various queues does not include bank identifier information for all of hierarchy levels 202, 204 and 206. In one embodiment, for example, scheduler memory 286 stores such information only for hierarchy level 202.

Operation of request selection module 280 will now be described according to one embodiment in which scheduler module 32 implements the scheduling hierarchy 200. Moreover, the operation will be described with reference to a scenario in which eligibility updates associated with queues 210-3, 212-3 and 214-4 were received in a first processing cycle, eligibility updates associated with queues 210-2, 210-4, 212-1 and 212-4 were received in a next (second) processing cycle, and eligibility updates associated with queues 214-2, 216-2 and 216-4 were received in a next (third) processing cycle, as depicted by the "arrival cycle #" numbers shown in parentheses in FIG. 3. For ease of explanation, operation of request selection module 280 will be described with respect to an embodiment in which request selection module 280 attempts to mitigate congestion only at hierarchy level 202 (e.g., scheduler memory 286 only stores, and/or request selection module 280 only considers, bank identifiers corresponding to hierarchy level 202). However, it is noted that, in other embodiments, bank identifiers for multiple hierarchy levels are utilized/considered.

In an embodiment, request selection module 280 inserts the eligibility updates into pending request buffer 284 in order of arrival, with a round robin algorithm being used for eligibility updates received in a single processing cycle. In one embodiment, for example, the round robin algorithm will first insert any eligibility update for queue 210-1 during a first processing cycle (and next insert any update for queue 210-2, etc.), will first insert any eligibility update for queue 210-2 during a second processing cycle (and next insert any update for queue 210-3, etc.), and so on. In other embodiments, other suitable algorithms are used for insertion of simultaneously received eligibility updates.

In some embodiments, request selection module 280 also extracts/retrieves from scheduler memory 286 the bank identifiers associated with each eligibility update inserted into pending request buffer 284. In one embodiment, the order of arrival for the example scenario described above and depicted in FIG. 3 results in the following order of eligibility updates in pending request buffer 284:

$$PRB_1 = \begin{bmatrix} 0 & 0 & 0 & 0 & 0 & 1 & 0 & 1 & 0 & 0 \\ 1 & 0 & 1 & 0 & 0 & 0 & 1 & 0 & 0 & 0 \\ 0 & 0 & 0 & 1 & 0 & 0 & 0 & 0 & 1 & 0 \\ 0 & 1 & 0 & 0 & 1 & 0 & 0 & 0 & 0 & 1 \end{bmatrix} \quad \text{(Equation 3)}$$

In the matrix $PRB_1$, each eligibility update corresponds to a column vector, with the column vector representing the bank identifier (for hierarchy level 202) that was extracted for the update. For example, the first column vector represents the bank identifier, for hierarchy level 202, associated with the eligibility update that was received in the oldest/earliest processing cycle (and given round robin priority over the simultaneously received eligibility updates). For the matrix $PRB_1$, the bank identifier represented by the first column vector indicates that the update is to be processed using the second of four memory banks (bank B of banks A through D) at hierarchy level 202.

In an embodiment, request selection module 280 selects a set of up to four eligibility updates, for processing at the hierarchy level 202, because four different memory banks are utilized at hierarchy level 202. In one embodiment, request selection module 280 selects eligibility updates by proceeding from the oldest to the newest update, and by selecting only those updates for which the corresponding bank identifier does not indicate a memory bank already reserved for another update. In one embodiment, for example, request selection module 280 selects a first set of eligibility updates that includes the updates corresponding to the first, second, fourth and sixth columns of matrix $PRB_1$ to be processed at the respective nodes of hierarchy level 202 during a first processing cycle. The updates corresponding to the third and fifth columns are excluded from the set, in an embodiment, because both have bank identifiers specifying memory banks that were already reserved for older updates (specifically, for the updates corresponding to the first and second columns of $PRB_1$) in the pending request buffer 284.

The selected first set of updates (corresponding to the first, second, fourth and sixth columns of matrix $PRB_1$), in this embodiment and scenario, corresponds to queues 210-3, 212-3, 210-2 and 212-1. As seen in FIG. 3, the updates associated with these queues are processed at leaf nodes of hierarchy level 202 (nodes 220-3, 222-3, 220-2 and 222-1, respectively) that utilize different memory banks (B, D, C and A, respectively). Because no two of these memory banks are the same, a collision of memory resources is avoided. After selecting these updates for processing at hierarchy level 202, in an embodiment, request selection module 280 re-orders the eligibility updates stored in pending request buffer 284 by removing the first set of updates, but maintaining the order of the remaining updates relative to one another. In one embodiment, for example, request selection module 280 re-orders $PRB_1$ to obtain a new matrix, $PRB_2$:

$$PRB_2 = \begin{bmatrix} 0 & 0 & 0 & 1 & 0 & 0 & * & * & * & * \\ 1 & 0 & 1 & 0 & 0 & 0 & * & * & * & * \\ 0 & 0 & 0 & 0 & 1 & 0 & * & * & * & * \\ 0 & 1 & 0 & 0 & 0 & 1 & * & * & * & * \end{bmatrix} \quad \text{(Equation 4)}$$

In the matrix $PRB_2$, asterisks ("*") represent bank identifier vectors for later-inserted eligibility updates, which are not important for purposes of this example. In an embodiment, request selection module 280 then selects a second set of eligibility updates that includes the updates corresponding to the first, second, fourth and fifth columns of matrix $PRB_2$ to be processed at the respective nodes of hierarchy level 202 during a second processing cycle. The update corresponding to the third column is excluded from the set, in an embodiment, because the update has a bank identifier specifying a memory bank that was already reserved for an older update (specifically, for the update corresponding to the first column of $PRB_2$) in the pending request buffer 284.

The selected second set of updates (first, second, fourth and fifth columns of matrix $PRB_2$), in this embodiment and scenario, corresponds to queues 214-4, 210-4, 214-2 and 216-2. As seen in FIG. 3, the updates associated with these queues are processed at leaf nodes of hierarchy level 202 (nodes 224-4, 220-4, 224-2 and 226-2, respectively) that utilize different memory banks (B, D, A and C, respectively). Because no two of these memory banks are the same, a collision of memory resources is again avoided. After selecting these updates for processing at hierarchy level 202, in an embodiment, request selection module 280 again re-orders the eligibility updates stored in pending request buffer 284 by removing the selected second set of updates, but maintaining the order of the remaining updates relative to one another.

It is noted that, in the embodiment and scenario described above, request selection matrix 280 is able to select the next set of updates for processing by analyzing the bank identifiers of ten different eligibility updates stored in pending request buffer 284. In other embodiments, however, pending request buffer 284 stores more than, or fewer than, ten updates at a time, and/or request selection module 280 analyzes more than, or fewer than, ten eligibility updates at a time when selecting the next set of updates to be processed at a hierarchy level 202. Generally, in some embodiments, and for a given number of memory banks, utilization of processing/memory resources is increased as the number of updates that are subject to re-ordering increases. This can be illustrated by one alternative embodiment in which request selection module 280 analyzes only five eligibility updates when selecting a set of updates for processing at hierarchy level 202. Considering again the above example scenario, but with this alternative embodiment, request selection module 280 selects the first set of updates from only the first five columns of $PRB_1$, which are shown in bold font below:

$$PRB_1 = \begin{bmatrix} \mathbf{0} & \mathbf{0} & \mathbf{0} & \mathbf{0} & \mathbf{0} & 1 & 0 & 1 & 0 & 0 \\ \mathbf{1} & \mathbf{0} & \mathbf{1} & \mathbf{0} & \mathbf{0} & 0 & 1 & 0 & 0 & 0 \\ \mathbf{0} & \mathbf{0} & \mathbf{0} & \mathbf{1} & \mathbf{0} & 0 & 0 & 0 & 1 & 0 \\ \mathbf{0} & \mathbf{1} & \mathbf{0} & \mathbf{0} & \mathbf{1} & 0 & 0 & 0 & 0 & 1 \end{bmatrix} \quad \text{(Equation 5)}$$

In one such embodiment, request selection module 280 selects a first set of eligibility updates that includes the updates corresponding to the first, second and fourth columns of matrix $PRB_1$ to be processed at the respective nodes of hierarchy level 202 during a first processing cycle. The updates corresponding to the third and fifth columns are excluded from the set, in an embodiment, because both have bank identifiers specifying memory banks that were already reserved for older updates in the pending request buffer 284. Because no updates beyond the first five are considered, however, request selection module 280 selects a total of only three updates for processing in the first processing cycle, in an embodiment. Thus, the processing capability at hierarchy level 202 is not fully utilized, in this embodiment/scenario. After removing the first selected set of updates and re-ordering, the following matrix results:

$$PRB_2 = \begin{bmatrix} 0 & 0 & 1 & 0 & 1 & 0 & 0 & * & * & * \\ 1 & 0 & 0 & 1 & 0 & 0 & 0 & * & * & * \\ 0 & 0 & 0 & 0 & 0 & 1 & 0 & * & * & * \\ 0 & 1 & 0 & 0 & 0 & 0 & 1 & * & * & * \end{bmatrix} \quad \text{(Equation 6)}$$

In an embodiment, request selection module 280 selects a second set of eligibility updates that includes the updates corresponding to the first, second and third columns of matrix $PRB_2$ to be processed at the respective nodes of hierarchy level 202 during a second processing cycle. The update corresponding to the fourth and fifth columns are excluded from the set, in an embodiment, because the corresponding bank identifiers specify memory banks that were already reserved for an older update in the pending request buffer 284. Thus, the processing capability at hierarchy level 202 is again not fully utilized for the second processing cycle, in this embodiment/scenario.

As noted above, the example embodiments and scenarios described above with reference to FIGS. 3-6 operate to mitigate collisions at hierarchy level 202. In other embodiments, however, request selection module 280 attempts to mitigate collisions at multiple hierarchy levels by considering the bank identifiers not only for hierarchy level 202, but also for hierarchy level 204 and/or hierarchy level 206. In one embodiment, for example, request selection module 280 uses banks identifiers for hierarchy levels 202 and 204 to select each set of eligibility updates, such that, if each update were to pass through levels 202 and 204 in just one processing cycle per level, no two updates of the set would contend for the same memory bank.

In some embodiments, eligibility updates are in some scenarios dropped (e.g., due to an excessive number of updates arriving at scheduling hierarchy 200). In some of these embodiments, strict priority is given to queues associated with a "low latency" QoS (e.g., only eligibility updates for low latency queues are dropped, or eligibility updates for low latency queues are dropped only after all possible updates for other queues have been dropped, etc.). In an embodiment, any eligibility updates that have been dropped are served using a daemon that generates new eligibility updates for the un-served queues.

In one embodiment, each of one or more of the re-ordering operations (e.g., re-ordering operation 260, 262 and/or 264) can be represented by the following algorithm/code for solving congestion between clients and memory banks, where each "client" refers to a process generating a different memory bank request:

```
function [banksVec] = readControlMatch(banksReqMatrix,
numOfBanks, reOderBufSize, numOfClients)
% Function inputs is banks request matrix per client where
the columns are
% client, and rows are bank requests, with 0 standing for a
null request. Each
% request is associated with an index to enable re-ordering.
% Output is vector of request index per client.
banksVec = zeros(numOfClients,1,'uint32');
% Algorithm description:
% Each client generates request to bank each iteration.
% The arbiter holds all pending requests for each bank in
request time order.
% Arbiter performs matching between the oldest request
to the free banks.
persistent pendingReqBuf;
if(isempty(pendingReqBuf))
    pendingReqBuf.bank = uint32(0);
    pendingReqBuf.client = uint32(0);
    pendingReqBuf.idx = uint32(0);
    for i = 1 : numOfClients*reOderBufSize
        pendingReqBuf(i).bank = uint32(0);
        pendingReqBuf(i).client = uint32(0);
        pendingReqBuf(i).idx = uint32(0);
    end
end
persistent last;
if(isempty(last))
    last = 0;
else
    last = mod(last+1,numOfClients);
end
% inserting new requests to the pending request buffer
for i = 1 : numOfClients*reOderBufSize
    if(pendingReqBuf(i).bank == 0)
        n = 1;
        for k = 1 : numOfClients
            c = mod(k+last,numOfClients)+1;
            if(banksReqMatrix(c).bank > 0)
                pendingReqBuf(i+n-1).bank =
uint32(banksReqMatrix(c). bank);
                pendingReqBuf(i+n-1).client = uint32(c);
                pendingReqBuf(i+n-1).idx = uint32(banks
ReqMatrix(c). idx);
                if((i+n-1>numOfClients*reOderBufSize) ||
(c>numOfClients))
                    str = sprintf('ERROR in insertion loop, banks=%d,
entry=%d, client =%d',numOfBanks,i+n-1,c);
                    disp(str);
                end
                n = n + 1;
            end
        end
        break;
    end
end
% matching request to banks
servedClients = zeros(numOfClients,1,'uint32');
servedBanks = zeros(numOfBanks,1,'uint32');
numOfServedClients = uint32(0);
for i = 1 : (numOfClients*reOderBufSize)
    if(pendingReqBuf(i).bank == 0)
        break;
    end
    if((servedBanks(pendingReqBuf(i).bank) == 0) &&
(servedClients(pendingReqBuf(i).client) == 0))
        banksVec(pendingReqBuf(i).client) = pendingReqBuf(i).idx;
        servedClient(pendingReqBuf(i).client) = 1;
        servedBanks(pendingReqBuf(i).bank) = 1;
        numOfServedClients = numOfServedClients + 1;
        pendingReqBuf(i).bank = uint32(0);
        pendingReqBuf(i).idx = uint32(0);
        pendingReqBuf(i).client = uint32(0);
        if(numOfServedClients == numOfClients)
            break;
        end
    end
end
% rearranging pending request buffer
for i = 1 : (numOfClients*reOderBufSize)-1
    if(pendingReqBuf(i).bank == 0)
        for j = i+1 : numOfClients*reOderBufSize
            if(pendingReqBuf(j).bank ~= 0)
                pendingReqBuf(i).bank = pendingReqBuf(j).bank;
                pendingReqBuf(i).idx = pendingReqBuf(j).idx;
                pendingReqBuf(i).client = pendingReqBuf(j).client;
                pendingReqBuf(j).bank = uint32(0);
                pendingReqBuf(j).idx = uint32(0);
                pendingReqBuf(j).client = uint32(0);
                break;
            end
        end
    end
end
```

Figure 5:
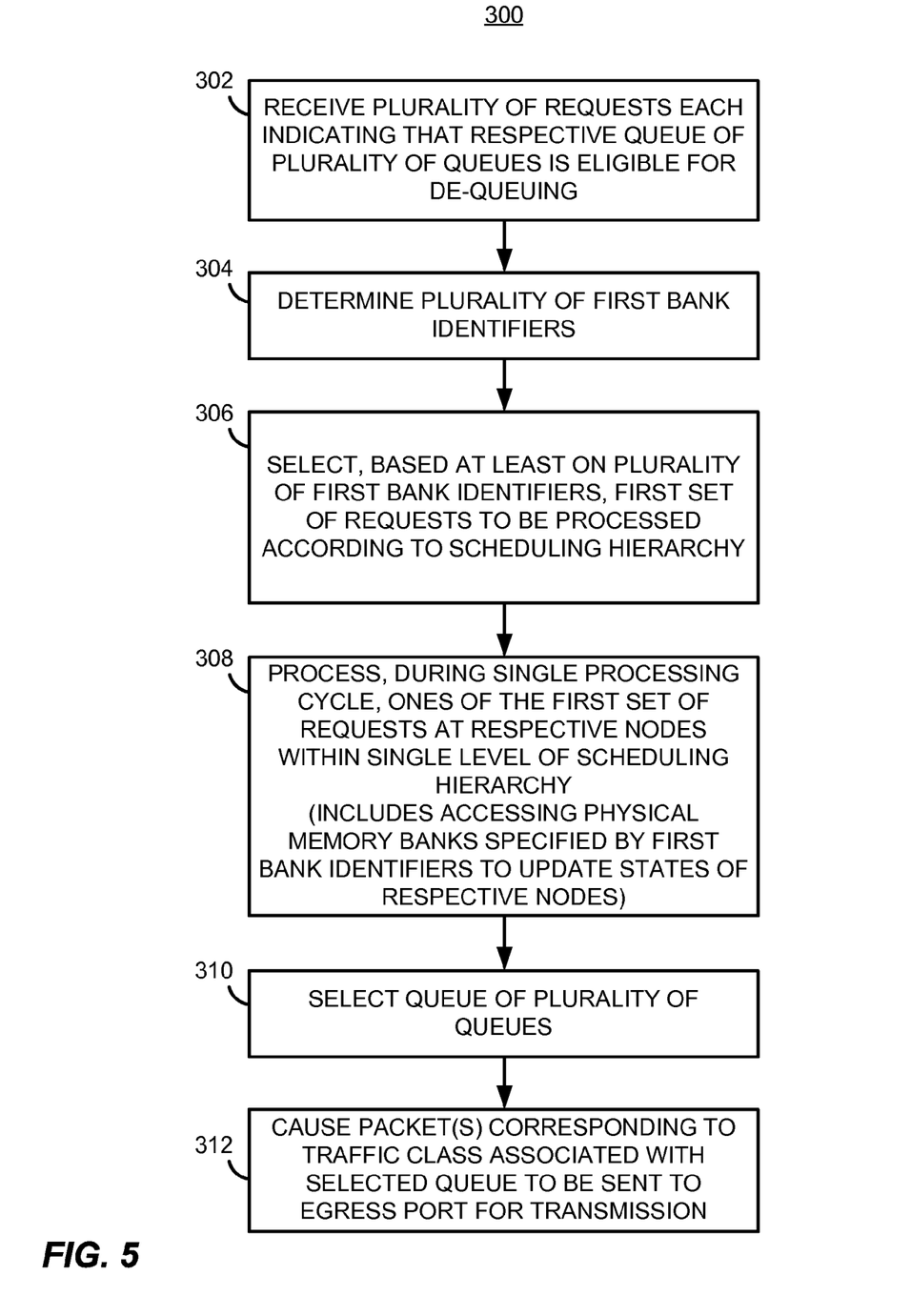
FIG. 5 is a flow diagram of an example method for scheduling network traffic, according to an embodiment.

FIG. 5 is a flow diagram of an example method 300 for scheduling network traffic, according to an embodiment. In an embodiment, the method 300 is implemented by a network device such as network device 10 of FIG. 1, for example. More specifically, in an embodiment, the method 300 is implemented by a scheduler such as scheduler module 32 of FIGS. 1 and 4, for example.

At block 302, a plurality of requests is received. In an embodiment, block 302 is implemented by a module similar to request selection module 280 of FIG. 4. Each of the requests indicates that a respective queue, of a plurality of queues, is eligible for de-queuing, in an embodiment. In some embodiments, the plurality of queues store data (e.g., descriptors) representing packets to be sent to an egress port of the network device implementing the method 300 for transmission over a network. In an embodiment, the queues of the plurality of queues are similar to queues 30-1 through 30-M of FIG. 1. In one embodiment, for example, the requests are eligibility updates received from a queue manager such as queue manager module 26 of FIG. 1. In some embodiments and scenarios, at least some of the requests received at block 302 are received in parallel during a single processing cycle. In an embodiment, receiving the plurality of requests at block 302 includes storing the requests in a pending request buffer (e.g., pending request buffer 284 of FIG. 4) according to an order in which the requests are received, and/or according to a round robin algorithm (or other suitable algorithm) for those requests, if any, that are received in parallel.

At block 304, a plurality of first bank identifiers is determined. In an embodiment, block 304 is implemented by a module similar to request selection module 280 of FIG. 4. In an embodiment, identifiers of the first bank identifiers are associated with different requests of the plurality of requests received at block 302, and specify respective physical memory banks of the network device implementing the method 300. In an embodiment, the plurality of first bank identifiers is determined by extracting the first bank identifiers from a memory, such as scheduler memory 286 of FIG. 4, for example.

At block 306, a first set of two or more requests to be processed according to a scheduling hierarchy is selected from the plurality of requests (received at block 302) based at least on the plurality of first bank identifiers (determined at block 306). In an embodiment, block 306 is implemented by a module similar to request selection module 280 of FIG. 4. In an embodiment, selecting the first set of requests includes prohibiting (e.g., using algorithms/rules that do not permit) any two requests of the first set of requests from being associated with a same first bank identifier. In some embodiments in which the plurality of requests are stored (at block 302) in a pending request buffer according to an order in which the requests are received (and/or according to a round robin or other suitable algorithm), selecting the first set of requests at block 306 includes selecting the requests from the pending request buffer based at least on both the plurality of first bank of identifiers and the order in which the plurality of requests is stored in the pending request buffer.

At block 308, during a single processing cycle, requests of the first set of requests (selected at block 306) are processed at respective nodes within a single level of the scheduling hierarchy (e.g., at nodes of a particular configuration of scheduling hierarchy 100 of FIG. 2, or at nodes of scheduling hierarchy 200 of FIG. 3). In an embodiment, block 308 is implemented by a module similar to scheduling hierarchy module 282 of FIG. 4. The processing performed at block 308 includes accessing the physical memory banks that are specified by the first bank identifiers associated with the requests to update states of the respective nodes. In an embodiment, the physical memory banks are similar to the memory banks 42 of FIG. 1. In one embodiment, the nodes are leaf nodes in the single level of the scheduling hierarchy. In some embodiments, the processing at block 308 includes not only processing according to a scheduler algorithm, but also according to a rate shaping algorithm, a flow control algorithm, or any other suitable algorithm.

At block 310, responsively at least to processing the requests of the first set of requests at block 308, a queue of the plurality of queues is selected. In an embodiment, block 310 is implemented by a module similar to scheduling hierarchy module 282 of FIG. 4. In some embodiments, the queue is selected by selecting a "winning" request (e.g., eligibility update) at the root node of the scheduling hierarchy, where the selected request is known to correspond to (or is determined to correspond to) the queue. In some embodiments and/or scenarios, the selection at block 310 occurs one, two, or more than two processing cycles after the processing at block 308 (e.g., depending at least on the number of hierarchy levels).

At block 312, responsively at least to selecting the queue at block 310, one or more packets corresponding to a traffic class associated with the selected queue are caused to be sent to the egress port for transmission over the network. In an embodiment, block 312 is implemented by a module similar to scheduling hierarchy module 282 of FIG. 4. In an embodiment, the one or more packets are caused to be sent to the egress port at block 312 at least by sending a de-queue command to a queue manager of the network device implementing the method 300, such as queue manager module 26 of FIG. 1, for example. In an embodiment, the de-queue command specifies at least the queue selected at block 310. In some embodiments, the de-queue command also includes other information, such as an amount of data (e.g., number of packets/descriptors) to be de-queued, and/or an identifier of the egress port, for example.

In some embodiments, the method 300 includes one or more additional blocks not seen in FIG. 5. In some embodiments, for example, the method 300 includes an additional block, after block 306, in which a pending request buffer is re-ordered at least in part by removing the selected first set of requests from the pending request buffer. In one such embodiment, the order of any remaining requests in the pending request buffer (relative to one another) is maintained.

In some embodiments, a plurality of second bank identifiers is also determined at block 304. In an embodiment, identifiers of the second bank identifiers are associated with different requests of the plurality of requests (received at block 302), and specify respective physical memory banks of the network device. Moreover, in an embodiment, selecting the first set of requests at block 306 is further based on the plurality of second bank identifiers, and further includes prohibiting any two requests of the first set of requests from being associated with a same second bank identifier. Further, in an embodiment, the method 300 includes an additional block in which requests of the first set of requests are processed at respective nodes within a subsequent single level of the scheduling hierarchy. In one such embodiment, processing the requests includes accessing the physical memory banks specified by the second bank identifiers associated with the processed requests to update states of the respective nodes within the subsequent single level of the scheduling hierarchy. In an embodiment, selecting the queue at block 310 is further responsive to processing the requests of the first set of requests at respective nodes within the subsequent single level of the scheduling hierarchy.

While various embodiments have been described with reference to specific examples, which are intended to be illustrative only and not to be limiting, changes, additions and/or deletions may be made to the disclosed embodiments without departing from the scope of the claims.

What is claimed is:

1. A method, implemented in a network device, for scheduling network traffic, the method comprising:
    receiving, in the network device, a plurality of requests each indicating that a respective queue, of a plurality of queues storing data representing packets to be sent to an egress port of the network device for transmission, is eligible for de-queuing;
    determining a plurality of first bank identifiers, ones of the first bank identifiers (i) being associated with different ones of the plurality of requests and (ii) specifying respective physical memory banks of the network device;
    selecting, from the received plurality of requests and based at least on the plurality of first bank identifiers, a first set of two or more requests to be processed according to a scheduling hierarchy, wherein selecting the first set of requests includes prohibiting any two requests of the first set of requests from being associated with a same first bank identifier;
    processing, in the network device and during a single processing cycle, ones of the first set of requests at respective nodes within a single level of the scheduling hierarchy, wherein processing ones of the first set of requests at the respective nodes within the single level of the scheduling hierarchy includes accessing the physical memory banks, specified by the first bank identifiers associated with the ones of the first set of requests, to update states of the respective nodes within the single level of the scheduling hierarchy;
    responsively at least to processing ones of the first set of requests at respective nodes within the single level of the scheduling hierarchy, selecting a queue of the plurality of queues; and
    responsively at least to selecting the queue, causing one or more packets corresponding to a traffic class associated with the selected queue to be sent to the egress port for transmission.

2. The method of claim 1, wherein:
    receiving the plurality of requests includes storing the plurality of requests in a pending request buffer according to an order in which the plurality of requests is received; and
    selecting the first set of requests includes selecting requests from the pending request buffer based at least in part on (i) the plurality of first bank identifiers and (ii) an order in which the plurality of requests is stored in the pending request buffer.

3. The method of claim 2, further comprising:
    after selecting the first set of requests, reordering the pending request buffer at least in part by removing the first set of requests from the pending request buffer.

4. The method of claim 1, wherein:
    receiving the plurality of requests includes storing the plurality of requests in a pending request buffer according to (i) an order in which the plurality of requests is received and (ii) a round robin algorithm for the requests of the plurality of requests, if any, that are received in parallel; and
    selecting the first set of requests includes selecting requests from the pending request buffer based at least in part on (i) the plurality of first bank identifiers and (ii) an order in which the plurality of requests is stored in the pending request buffer.

5. The method of claim 1, wherein:
    receiving the plurality of requests includes (i) receiving a first request, (ii) receiving a second request after receiving the first request, and (iii) receiving a third request after receiving the second request;
    determining a plurality of first bank identifiers includes (i) determining a same first bank identifier associated with both the first request and the second request, and (ii) determining a different first bank identifier associated with the third request; and
    selecting the first set of requests includes selecting the first request and the third request but not the second request.

6. The method of claim 1, wherein determining a plurality of first bank identifiers includes using the received plurality of requests to extract the plurality of first bank identifiers from a memory.

7. The method of claim 1, wherein processing ones of the requests of the first set of requests at respective nodes within the single level of the scheduling hierarchy includes processing ones of the first set of requests at respective leaf nodes included in the single level of the scheduling hierarchy.

8. The method of claim 1, wherein processing ones of the first set of requests at respective nodes within the single level of the scheduling hierarchy includes applying respective flow control algorithms at the respective nodes within the single level of the scheduling hierarchy.

9. The method of claim 1, wherein processing ones of the first set of requests at respective nodes within the single level of the scheduling hierarchy includes applying respective rate shaping algorithms at the respective nodes within the single level of the scheduling hierarchy.

10. The method of claim 1, wherein causing one or more packets corresponding to a traffic class associated with the selected queue to be sent to the egress port for transmission includes sending a de-queue command to a queue manager of the network device, the de-queue command specifying at least the selected queue.

11. The method of claim 1, wherein:
    determining a plurality of first bank identifiers further includes determining a plurality of second bank identifiers, ones of the second bank identifiers (i) being associated with different ones of the plurality of requests and (ii) specifying respective physical memory banks of the network device,
    selecting the first set of requests is further based on the plurality of second bank identifiers, and further includes prohibiting any two requests of the first set of requests from being associated with a same second bank identifier;
    the method further comprises processing ones of the first set of requests at respective nodes within a subsequent single level of the scheduling hierarchy, wherein processing ones of the first set of requests at the respective nodes within the subsequent single level of the scheduling hierarchy includes accessing the physical memory banks, specified by the second bank identifiers associated with the ones of the first set of requests, to update states of the respective nodes within the subsequent single level of the scheduling hierarchy; and
    selecting the queue is further responsive to processing the ones of the first set of requests at respective nodes within the subsequent single level of the scheduling hierarchy.

12. A network device comprising:
a plurality of ports including an egress port;
a plurality of queues configured to store data representing packets to be sent to the egress port for transmission;
a plurality of physical memory banks; and
a packet processor comprising
   a queue manager module configured to send requests to de-queue data stored in the plurality of queues, and
   a scheduler module comprising
      a request selection module configured to
         receive, from the queue manager module, a plurality of requests each indicating that a respective queue of the plurality of queues is eligible for de-queuing,
         determine a plurality of first bank identifiers, ones of the first bank identifiers (i) being associated with different ones of the plurality of requests and (ii) specifying respective ones of the plurality of physical memory banks, and
         select, from the received plurality of requests and based at least on the plurality of first bank identifiers, a first set of two or more requests to be processed according to a scheduling hierarchy, wherein the request selection module is configured to select the first set of requests at least by prohibiting any two requests of the first set of requests from being associated with a same first bank identifier, and
      a scheduling hierarchy module configured to
         process, during a single processing cycle, ones of the first set of requests at respective nodes within a single level of the scheduling hierarchy, wherein the scheduling hierarchy module is configured to process the ones of the first set of requests at the respective nodes within the single level of the scheduling hierarchy at least by accessing the physical memory banks, specified by the first bank identifiers associated with the ones of the first set of requests, to update states of the respective nodes within the single level of the scheduling hierarchy,
         responsively at least to processing the ones of the first set of requests at respective nodes within the single level of the scheduling hierarchy, select a queue of the plurality of queues, and
         responsively at least to selecting the queue, cause one or more packets corresponding to a traffic class associated with the selected queue to be sent to the egress port for transmission.

13. The network device of claim 12, further comprising a pending request buffer, wherein the request selection module is configured to:
receive the plurality of requests at least by storing the plurality of requests in the pending request buffer according to an order in which the request selection module receives the plurality of requests; and
select the first set of requests from the pending request buffer based at least in part on (i) the plurality of first bank identifiers and (ii) an order in which the plurality of requests is stored in the pending request buffer.

14. The network device of claim 13, wherein the request selection module is further configured to:
after selecting the first set of requests, reorder the pending request buffer at least in part by removing the first set of requests from the pending request buffer.

15. The network device of claim 12, further comprising a pending request buffer, wherein the request selection module is configured to:
receive the plurality of requests at least by storing the plurality of requests in the pending request buffer according to (i) an order in which the request selection module receives the plurality of requests and (ii) a round robin algorithm for the requests of the plurality of requests, if any, that are received in parallel; and
select the first set of requests from the pending request buffer based at least in part on (i) the plurality of first bank identifiers, (ii) an order in which the plurality of requests is stored in the pending request buffer.

16. The network device of claim 12, further comprising a scheduler memory, wherein the request selection module is configured to determine the plurality of first bank identifiers at least by using the received plurality of requests to extract the plurality of first bank identifiers from the scheduler memory.

17. The network device of claim 12, wherein the scheduling hierarchy module is configured to process ones of the first set of requests at respective leaf nodes included in the single level of the scheduling hierarchy.

18. The network device of claim 12, wherein the scheduling hierarchy module is configured to process ones of the first set of requests at respective nodes within the single level of the scheduling hierarchy in part by one or both of (i) applying respective flow control algorithms at the respective nodes within the single level of the scheduling hierarchy, and (ii) applying respective rate shaping algorithms at the respective nodes within the single level of the scheduling hierarchy.

19. The network device of claim 12, wherein the scheduling hierarchy module is configured to cause the one or more packets corresponding to the traffic class associated with the selected queue to be sent to the egress port for transmission at least by sending a de-queue command to the queue manager module, the de-queue command specifying at least the selected queue.

20. The network device of claim 12, wherein:
the request selection module is further configured to determine a plurality of second bank identifiers, ones of the second bank identifiers (i) being associated with different ones of the plurality of requests and (ii) specifying respective ones of the plurality of physical memory banks;
the request selection module is configured to select the first set of requests (i) based further on the plurality of second bank identifiers, and (ii) by further prohibiting any two requests of the first set of requests from being associated with a same second bank identifier;
the scheduling hierarchy module is further configured to process ones of the first set of requests at respective nodes within a subsequent single level of the scheduling hierarchy;
the scheduling hierarchy module is configured to process ones of the first set of requests at the respective nodes within the subsequent single level of the scheduling hierarchy at least by accessing the physical memory banks, specified by the second bank identifiers associated with the ones of the first set of requests, to update states of the respective nodes within the subsequent single level of the scheduling hierarchy; and
the scheduling hierarchy module is configured to select the queue further in response to processing the ones of the first set of requests at respective nodes within the subsequent single level of the scheduling hierarchy.

* * * * *